(12) United States Patent
Dechene et al.

(10) Patent No.: US 10,956,160 B2
(45) Date of Patent: Mar. 23, 2021

(54) METHOD AND APPARATUS FOR A MULTI-LEVEL RESERVATION STATION WITH INSTRUCTION RECIRCULATION

(71) Applicant: Intel Corporation, Santa Clara, CA (US)

(72) Inventors: Mark Dechene, Hillsboro, OR (US); Srikanth Srinivasan, Portland, OR (US); Matthew Merten, Hillsboro, OR (US); Ammon Christiansen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 16/367,171

(22) Filed: Mar. 27, 2019

(65) Prior Publication Data

US 2020/0310801 A1 Oct. 1, 2020

(51) Int. Cl.
*G06F 9/30* (2018.01)
*G06F 9/22* (2006.01)
(Continued)

(52) U.S. Cl.
CPC ........... *G06F 9/30145* (2013.01); *G06F 9/22* (2013.01); *G06F 9/3838* (2013.01); *G06F 9/4881* (2013.01)

(58) Field of Classification Search
None
See application file for complete search history.

(56) References Cited

U.S. PATENT DOCUMENTS 5,519,864 A * 5/1996 Martell ................. G06F 9/3855
712/215
5,754,812 A * 5/1998 Favor .................. G06F 9/30149
712/214
(Continued)

FOREIGN PATENT DOCUMENTS

WO 2006/016927 A2 2/2006
WO 2006/039201 A2 4/2006

OTHER PUBLICATIONS

Canal et al., "A Low-Complexity Issue Logic", International Conference on Super-Computing, Conference Proceedings, ACM, May 8, 2020, pp. 327-335.
(Continued)

*Primary Examiner* — Michael Sun
(74) *Attorney, Agent, or Firm* — Nicholson De Vos Webster & Elliott LLP

(57) ABSTRACT

A processor and method are described for a multi-level reservation station. For example, one embodiment of an apparatus comprises: execution circuitry comprising a plurality of functional units to execute a plurality of operations; a reservation station comprising a plurality of entries to store a corresponding plurality of operations to be executed on one or more of the functional units, the reservation station comprising: a first RS level to hold a first subset of the plurality of operations which are ready for execution by one or more functional units or which are expected to be ready for execution by the functional units; a second RS level to hold a second subset of the plurality of operations which are not expected to be ready for execution by the functional units; operation evaluation circuitry to evaluate operations in the first RS level and, responsive to identifying one or more operations which are not expected to be ready for execution,
(Continued)

to cause the one or more operations to be moved from the first RS level to the second RS level.

33 Claims, 12 Drawing Sheets

(51) Int. Cl.
*G06F 9/38* (2018.01)
*G06F 9/48* (2006.01)

(56) References Cited

U.S. PATENT DOCUMENTS

| | | | | |
|---|---|---|---|---|
| 7,979,677 | B2* | 7/2011 | Nguyen | G06F 9/3861 |
| | | | | 712/214 |
| 10,191,748 | B2* | 1/2019 | Mathew | G06F 9/30043 |
| 2005/0251664 | A1 | 11/2005 | Caprioli et al. | |
| 2008/0040589 | A1* | 2/2008 | Sakamoto | G06F 9/384 |
| | | | | 712/229 |
| 2008/0133889 | A1 | 6/2008 | Glew | |
| 2013/0346995 | A1* | 12/2013 | Jackson | G06F 9/5072 |
| | | | | 718/104 |
| 2014/0208074 | A1* | 7/2014 | Babayan | G06F 9/3851 |
| | | | | 712/206 |
| 2015/0095627 | A1* | 4/2015 | Dechene | G06F 9/3877 |
| | | | | 712/228 |
| 2015/0309793 | A1* | 10/2015 | Kurd | G06F 9/30145 |
| | | | | 712/225 |
| 2015/0309797 | A1* | 10/2015 | Wilson | G06F 9/30145 |
| | | | | 712/217 |
| 2015/0309798 | A1* | 10/2015 | Kurd | G06F 9/3855 |
| | | | | 712/226 |
| 2016/0011877 | A1* | 1/2016 | Mukherjee | G06F 9/384 |
| | | | | 712/208 |
| 2017/0351437 | A1* | 12/2017 | Marinescu | G06F 3/067 |

OTHER PUBLICATIONS

European Search Report and Search Opinion, EP App. No. 20153754. 5, dated Aug. 13, 2020, 16 pages.
Jothi et al, "Streamlining the Continual Flow Processor Architecture With Fast Replay Loop", EuroCon 2013, Jul. 1-4, 2013, pp. 1821-1828.
Lebeck et al., "A Large, Fast Instruction Window for Tolerating Cache Misses", 29th Annual International Symposium on Computer Architecture, May 25, 2002, 12 pages.
Zhao et al., "An Energy-Efficient Instruction Scheduler Design with Two-Level Shelving and Adaptive Banking", J. Comput. Sci. & Technol., vol. 22, No. 1, Jan. 2007, pp. 15-24.

* cited by examiner

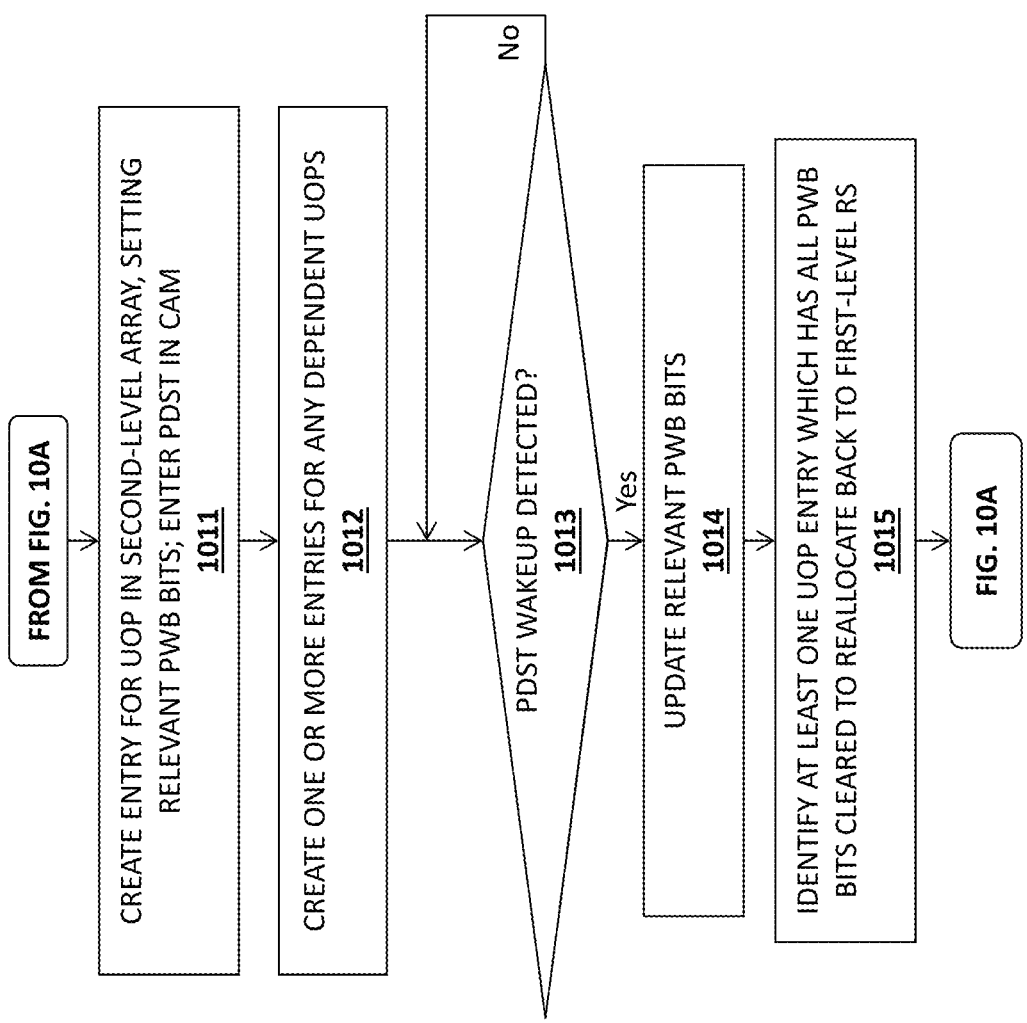

METHOD AND APPARATUS FOR A MULTI-LEVEL RESERVATION STATION WITH INSTRUCTION RECIRCULATION

BACKGROUND

Field of the Invention

This invention relates generally to the field of computer processors and software. More particularly, the invention relates to a method and apparatus for a multi-level reservation station with instruction recirculation.

Description of the Related Art

Reservation Stations (RS) are used to hold instructions in an Out-of-Order (OOO) execution machine between the allocation stage which allocates processing resources to an instruction and the dispatch stage which dispatches the instruction (potentially as a set of microoperations) to the functional units of the processor. Current reservation stations wait until all sources of the instruction are ready, and then schedule the instruction for execution. RS structures are large area, high power, timing critical, and critical for enabling performance in modern high-performance OOO architectures. Growing RS structures to hold more instructions is critical for increasing performance, yet growing in a conventional fashion is blocked by area, power, and timing costs of current designs.

BRIEF DESCRIPTION OF THE DRAWINGS

A better understanding of the present invention can be obtained from the following detailed description in conjunction with the following drawings, in which:

FIGS. 10A-B illustrate a method in accordance with one embodiment of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
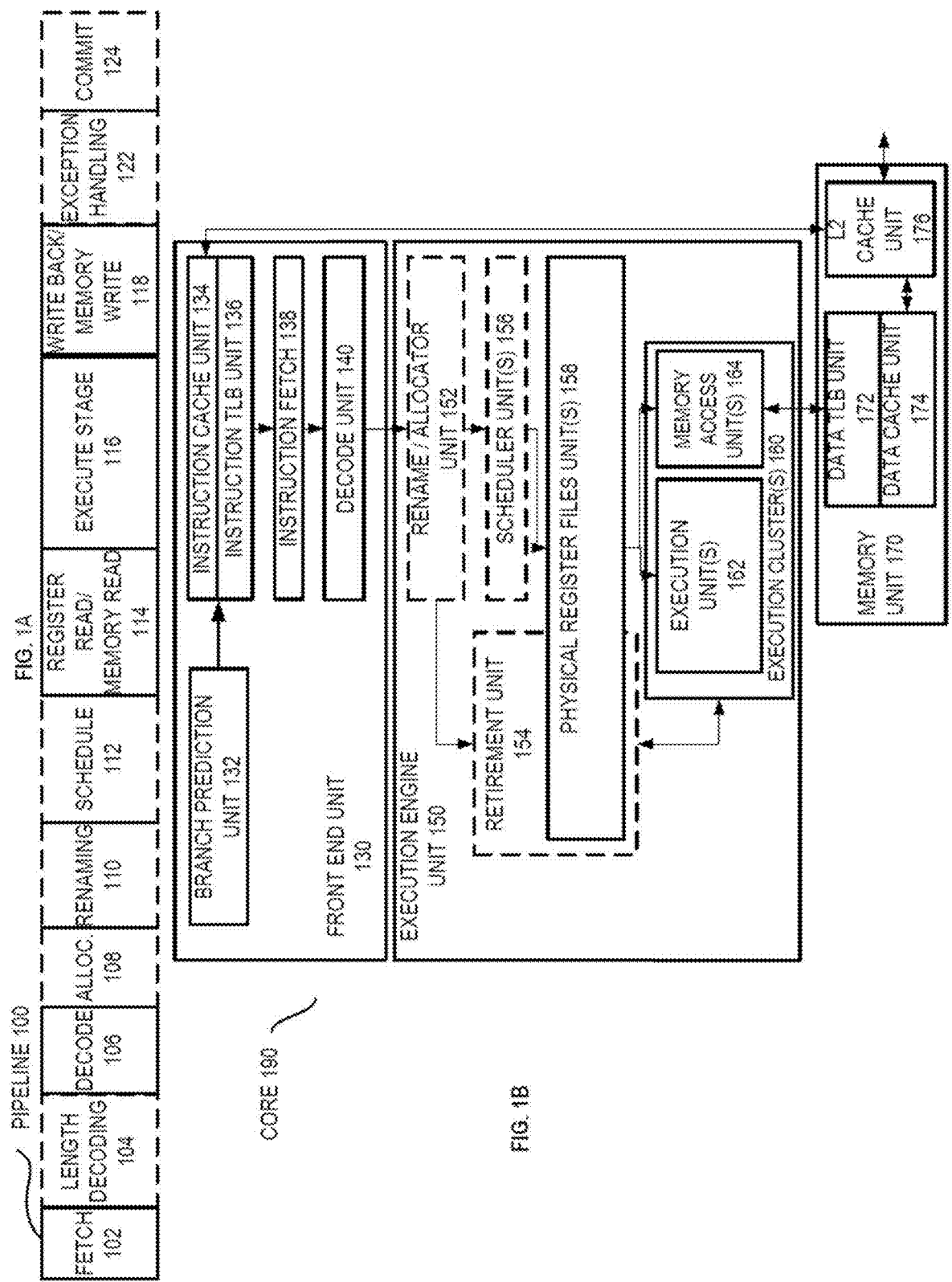
FIG. 1A is a block diagram illustrating both an exemplary in-order fetch, decode, retire pipeline and an exemplary register renaming, out-of-order issue/execution pipeline according to embodiments of the invention.
FIG. 1B is a block diagram illustrating both an exemplary embodiment of an in-order fetch, decode, retire core and an exemplary register renaming, out-of-order issue/execution architecture core to be included in a processor according to embodiments of the invention.

FIG. 1A is a block diagram illustrating both an exemplary in-order fetch, decode, retire pipeline and an exemplary register renaming, out-of-order issue/execution pipeline according to embodiments of the invention. FIG. 1B is a block diagram illustrating both an exemplary embodiment of an in-order fetch, decode, retire core and an exemplary register renaming, out-of-order issue/execution architecture core to be included in a processor according to embodiments of the invention. The solid lined boxes in FIGS. 1A-B illustrate the in-order portions of the pipeline and core, while the optional addition of the dashed lined boxes illustrates the register renaming, out-of-order issue/execution pipeline and core.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
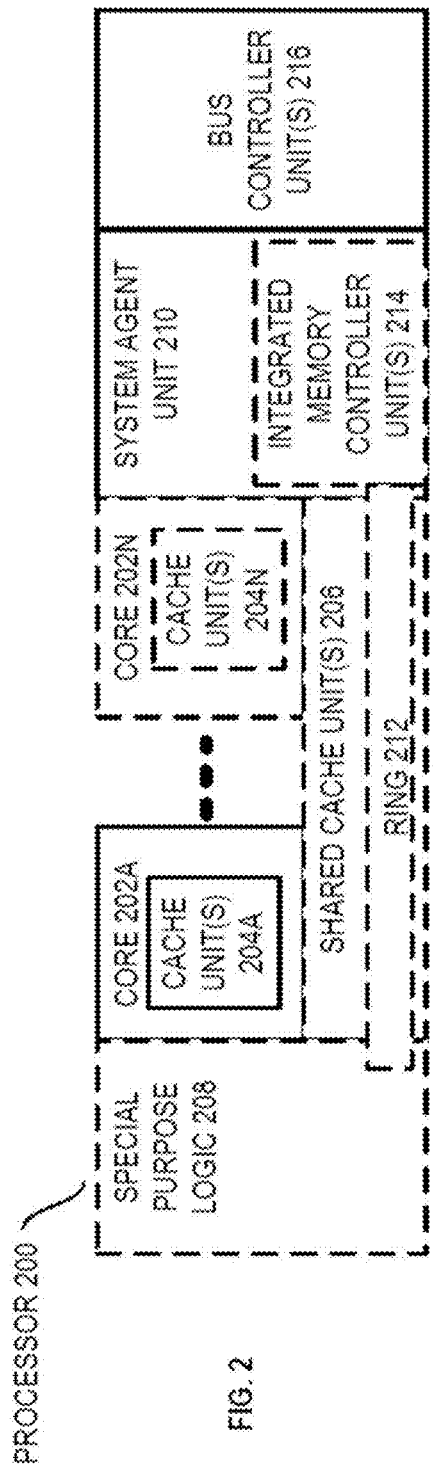
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
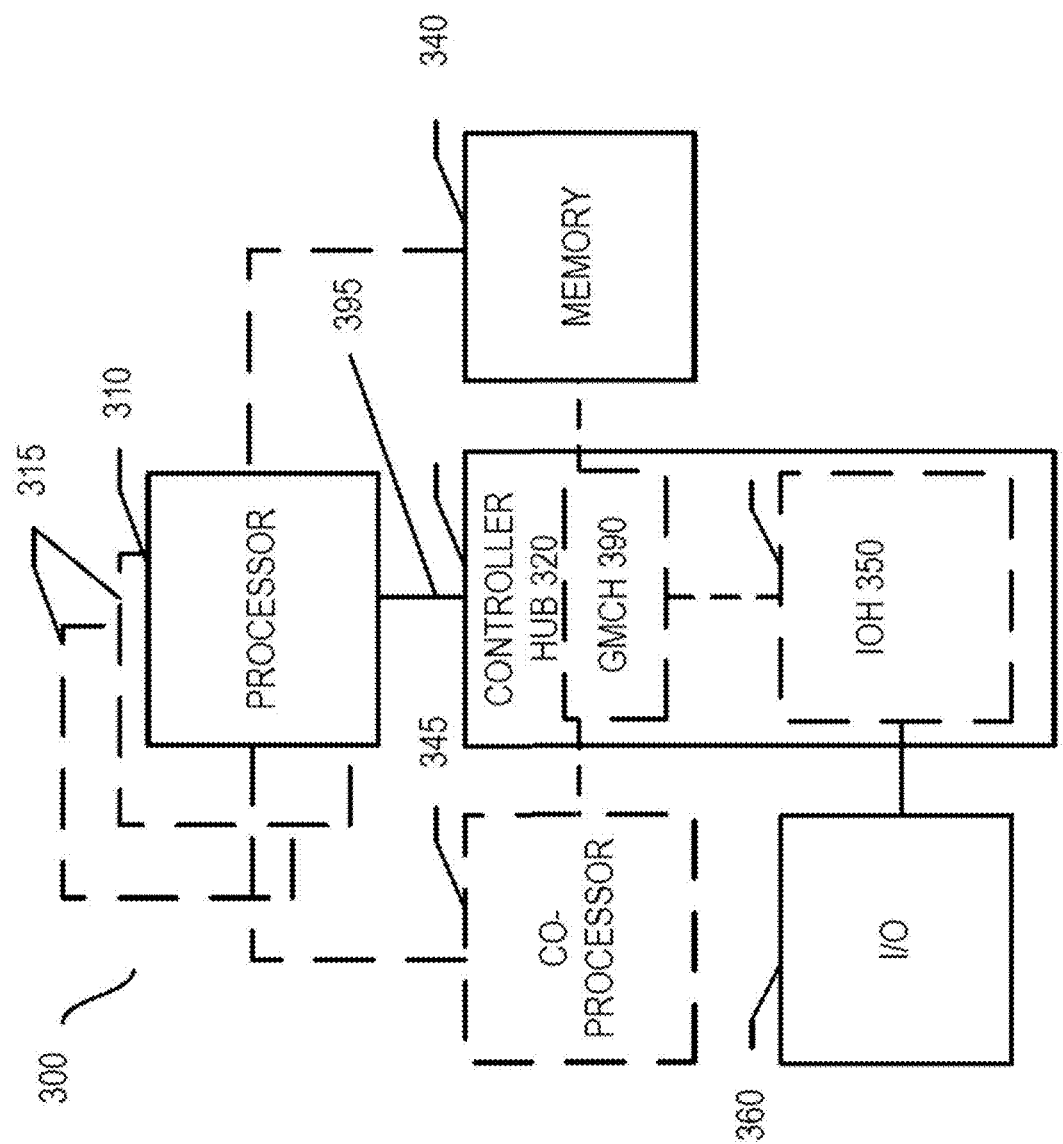
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
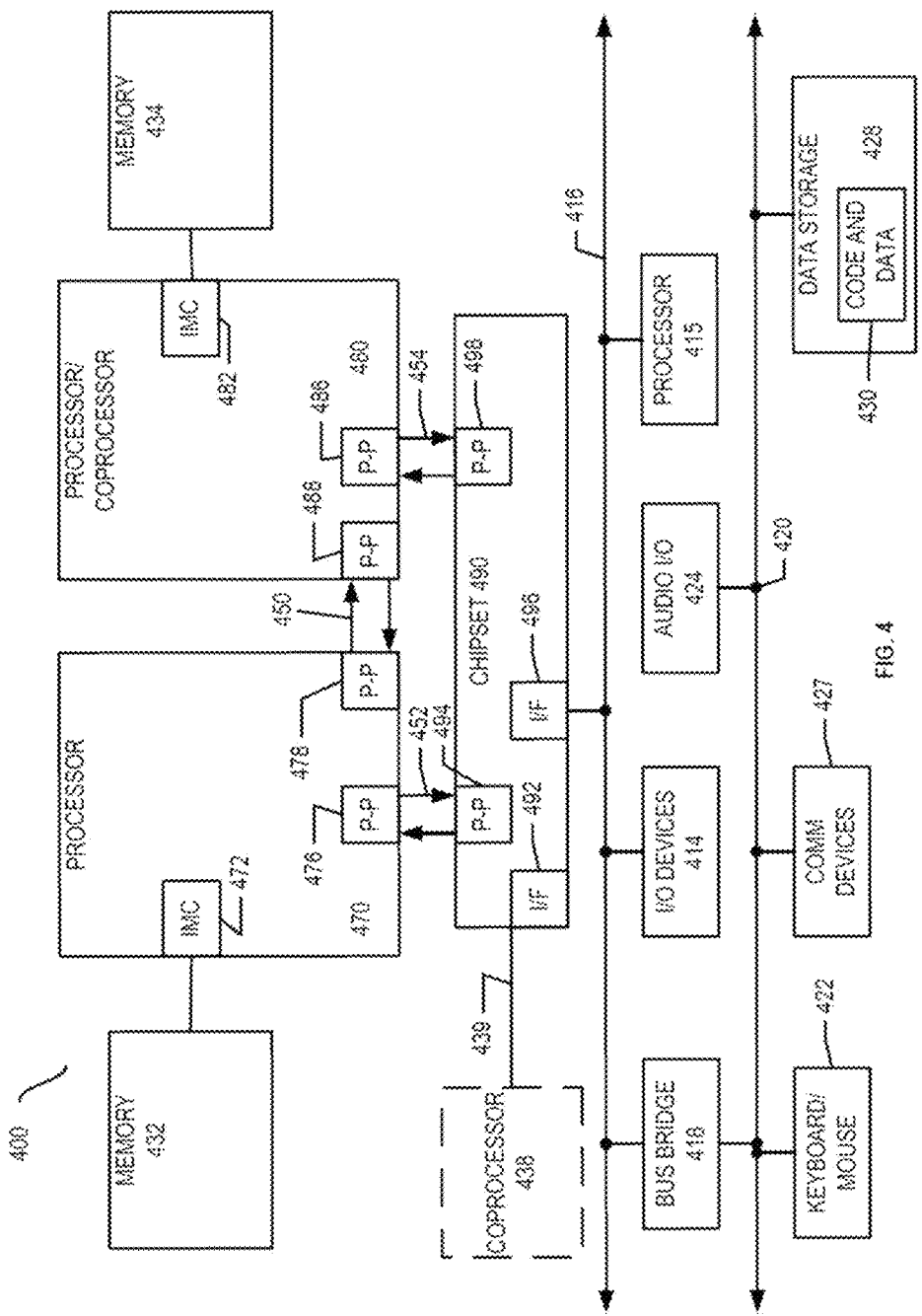
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
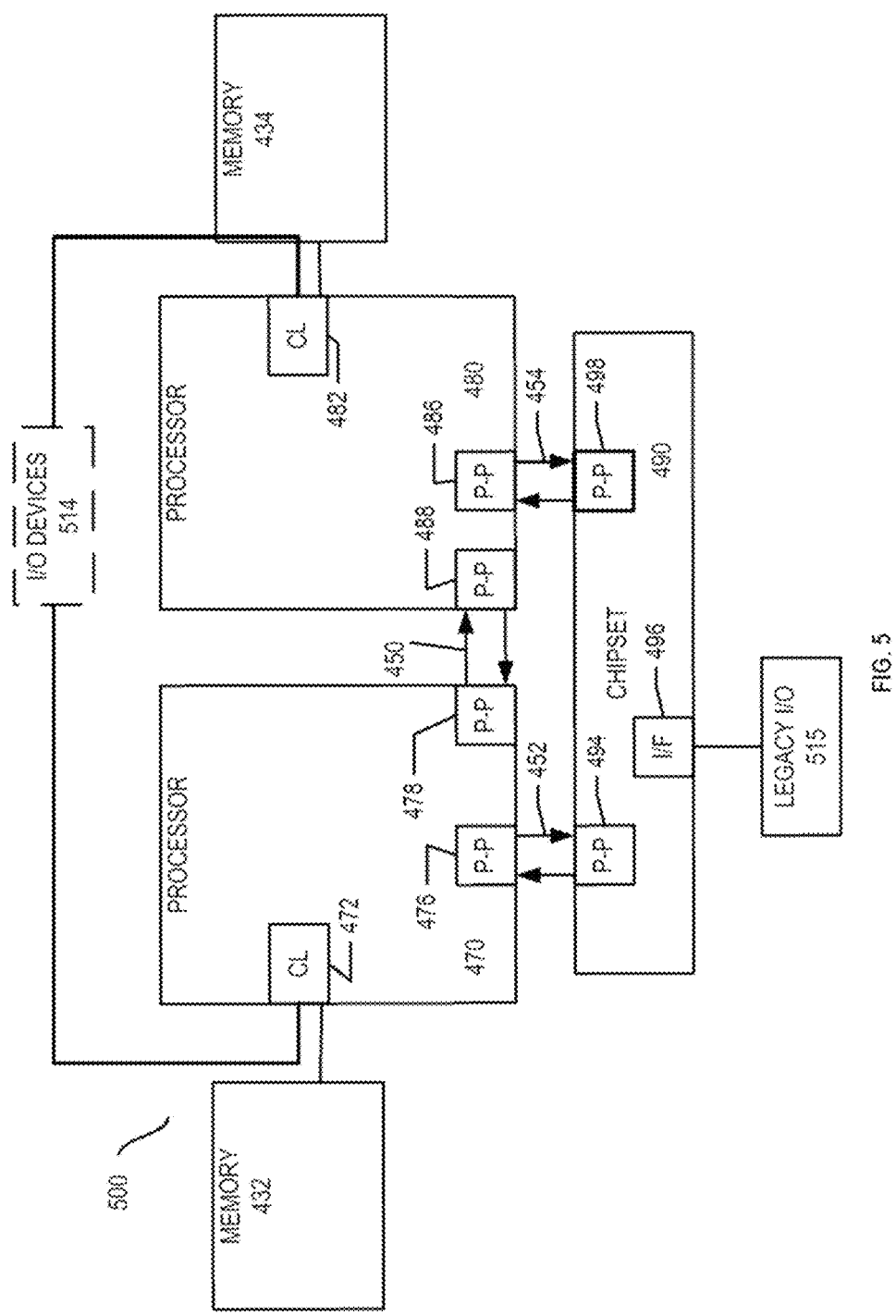
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
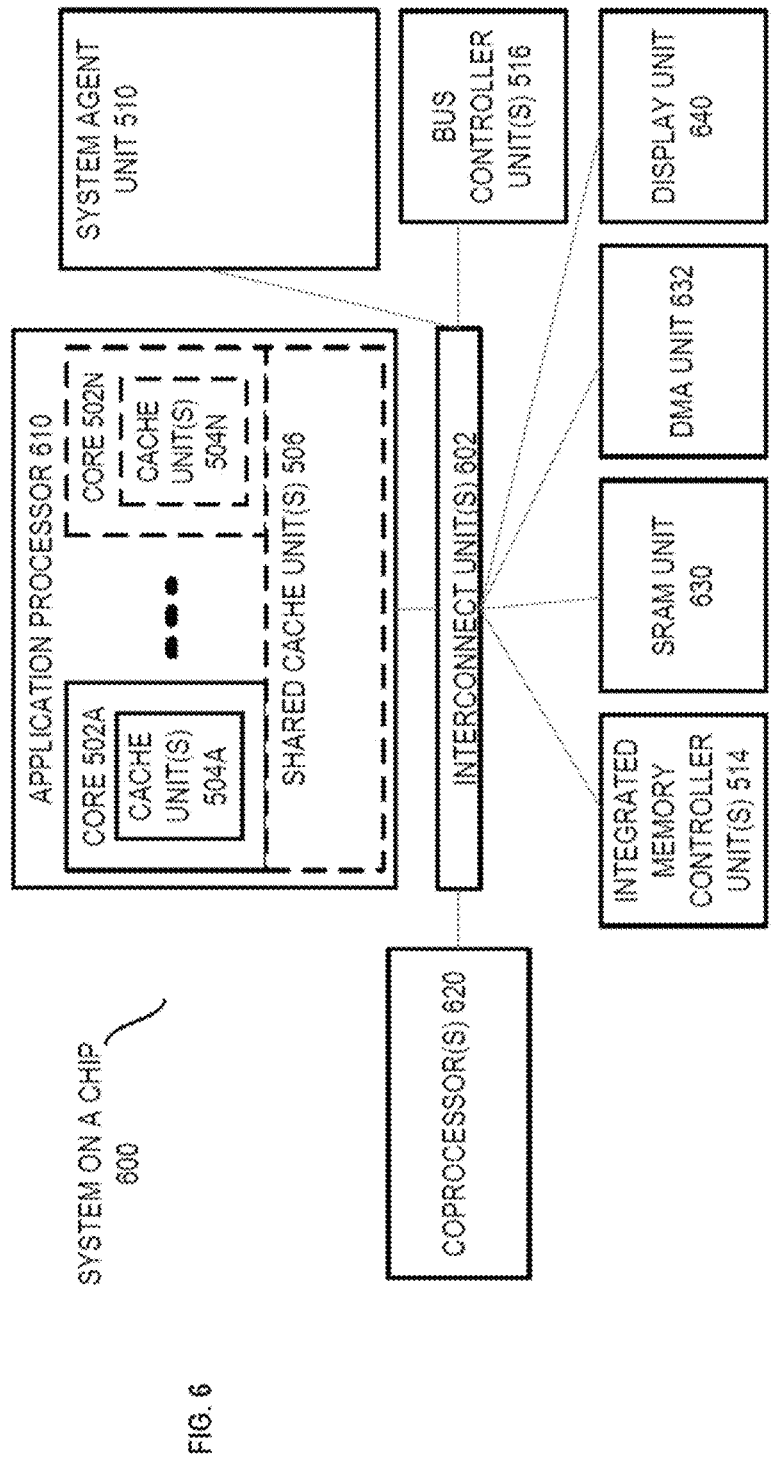
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
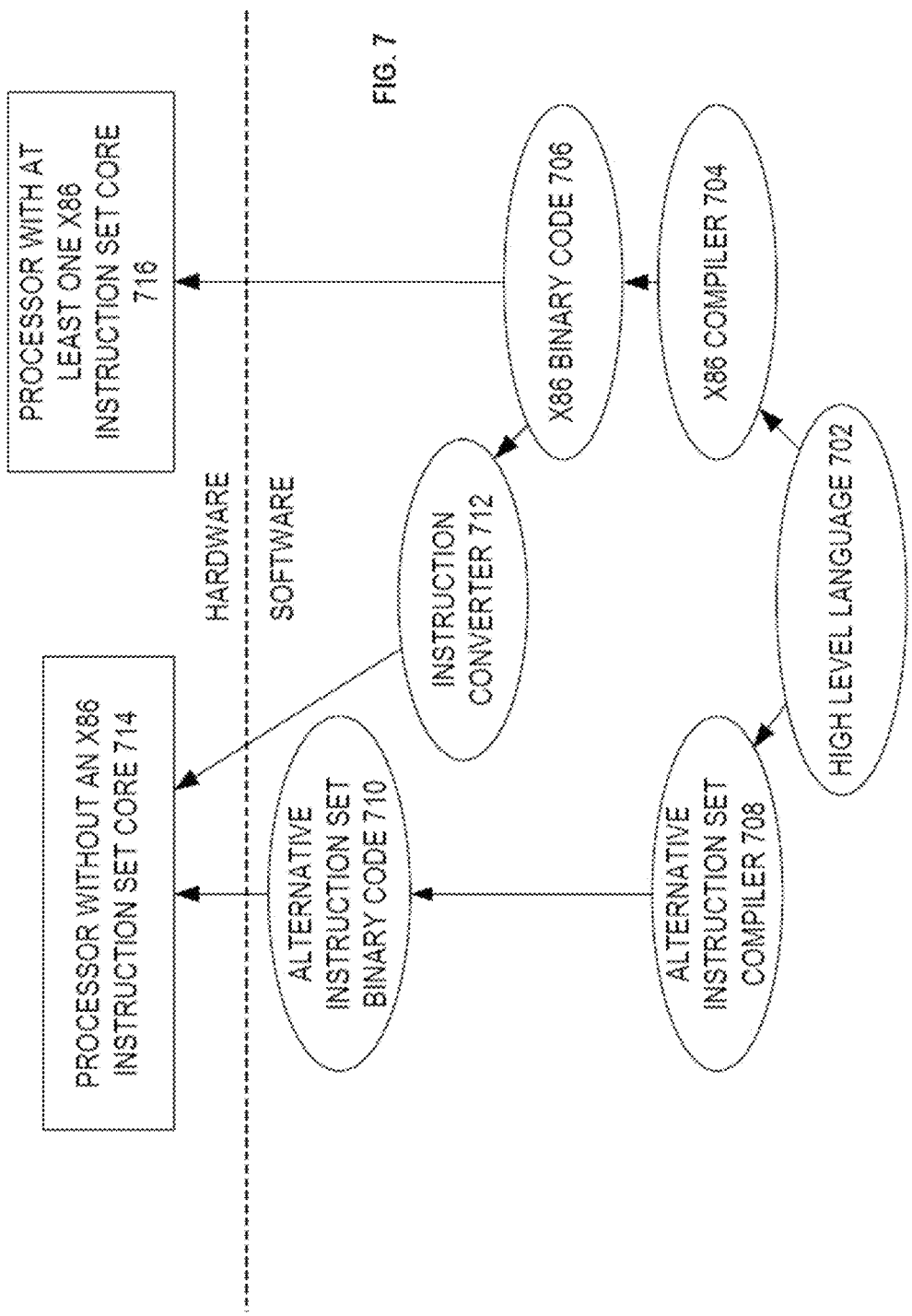
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Method and Apparatus for Multi-Level Reservation Station with Instruction Recirculation Introduction As mentioned above, increasing the capacity of reservation station (RS) structures to queue more instructions is critical for increasing performance. However, increasing the RS in a conventional fashion is impractical given area, power, and timing costs of current designs.

One embodiment of the invention provides a cost-effective increase in RS capacity using a multi-level RS architecture. In one embodiment, the first level of the RS contains single-cycle wakeup logic that consumes relatively more power and is timing critical. The first-level circuitry is responsible for scheduling uops with ready sources into the execution pipelines. The second level of the RS contains bulk storage for instructions that are unlikely to wake up and be scheduled in upcoming cycles (e.g., because these "delinquent" uops are unlikely to have all of their sources ready in the short term). As a result, the second level is logically simpler than the first level, keeping the area, timing, and power manageable. In one implementation, when a uop in the second level becomes more likely to have its sources ready, the uop is moved from the second level to the first level, where it becomes eligible to schedule when its sources become ready.

Architectural Overview

Figure 8:
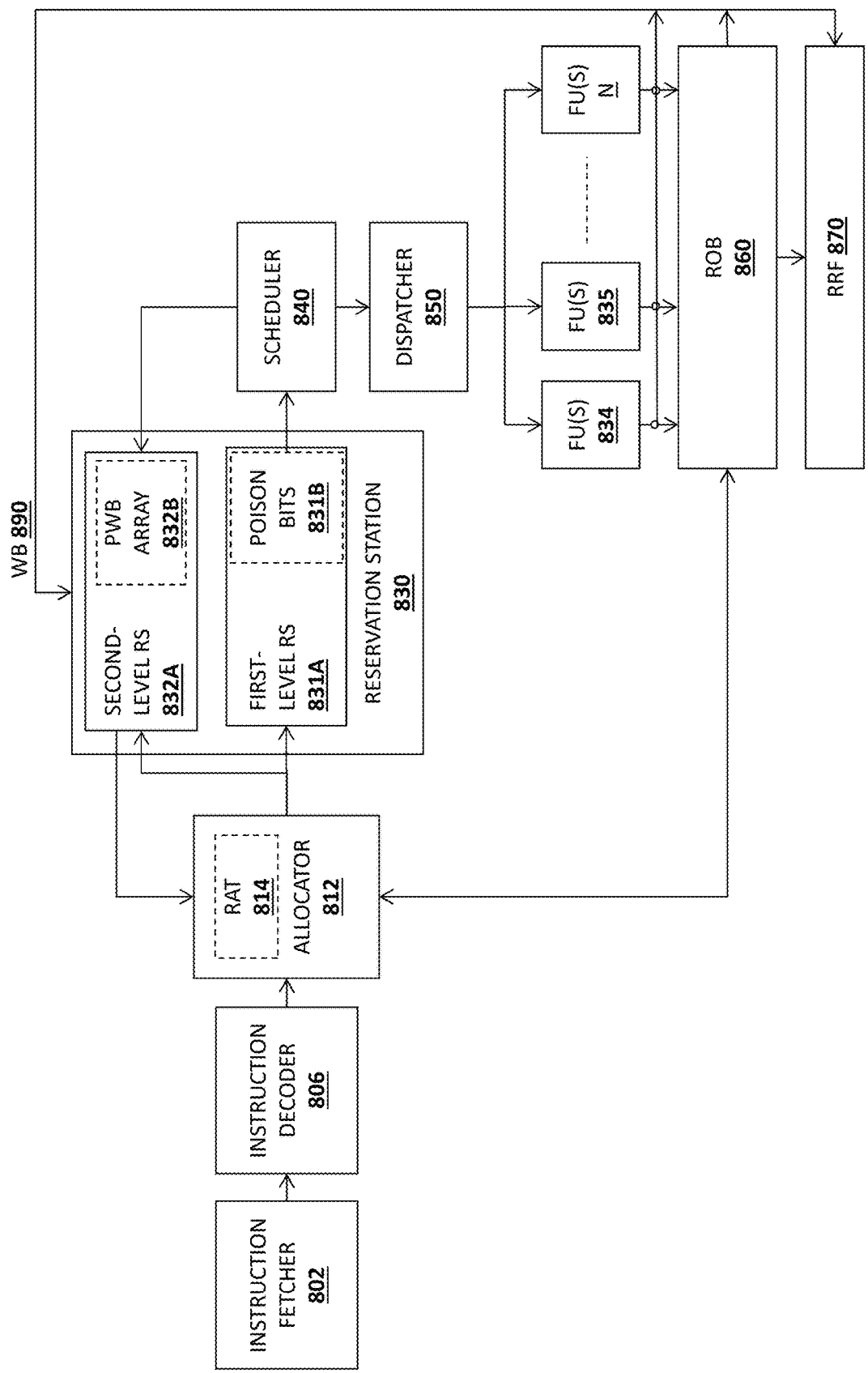
FIG. 8 illustrates one embodiment of a two-level reservation station.

FIG. 8 illustrates one embodiment of a reservation station 830 which includes a first level RS 831A and a second level RS 832A. An instruction fetcher 802 fetches instructions from cache or memory (not shown) as specified by the current instruction pointer. An instruction decoder 806 decodes each instruction into one or more micro-operations (uops) and an allocator 812 assigns each uop to a location in the reorder buffer (ROB) 860, thereby mapping the logical destination address of the uop to a corresponding physical destination address in the ROB 860. This mapping is maintained by a register alias table (RAT) 814.

The contents of a ROB 860 are retired to locations in a real register file (RRF) 870. The RAT 814 also stores a real register file valid bit that indicates whether the value indicated by the logical address is to be found at the physical address in the recorder buffer (ROB) or in the RRF after retirement. If found in the RRF, the value is considered to be part of the current processor architectural state or "context." Based upon this mapping, the register alias table (RAT) 814 also associates every logical source address to a corresponding location in the ROB 860 or the RRF 870.

The reservation station (RS) 830 queues the uops awaiting execution by an appropriate functional unit 834, 835, N. Different processor architectures may include different types of functional units 834, 835, N including, for example, integer execution units, floating point execution units, memory execution units, SIMD execution units, and address generation units, etc. When all source values are available, a scheduler 840 schedules the uop for execution and a dispatcher 850 sends the uop to the relevant functional unit 834-835, N. Results produced by a functional unit 834-835, N and/or written to the ROB 860 may be written back to the RS 830 as indicated by writeback connection 890.

Embodiments of a Multi-Level Reservation Station

As mentioned, in one embodiment of the invention the first-level RS 831A arbitrates for uop scheduling and dispatching while the second-level RS stores uops which not expected to be scheduled in the next several cycles (e.g., in the next N cycles where N may be statically or dynamically determined). Each RS level is optimized for its particular piece of the problem. The first-level RS 831A is optimized for back-to-back execution while the second-level RS 832A is optimized for long-term storage, and tracks wakeups at a coarser, slower level than the first-level RS 830. As such, the arrays for the second-level RS 832A consume less area and consume less power on a per-entry basis than the first-level RS 831A.

In one embodiment, the first-level RS 831A is built in a similar manner to an existing RS, but with the following differences. First, allocation can occur from either new uops arriving from the allocator 812 or from recirculated uops that arrive from the second-level RS 832A (although these may also pass through the allocator 812). In one implementation, poison bits 831B are added to each entry in the first level RS 831A to indicate whether a uop was scheduled as a "delinquent" uop, resulting in movement of the uop from the first-level RS 831B to the second-level RS 832A, or if the uop was scheduled for dispatch into the execution pipeline.

Figure 9:
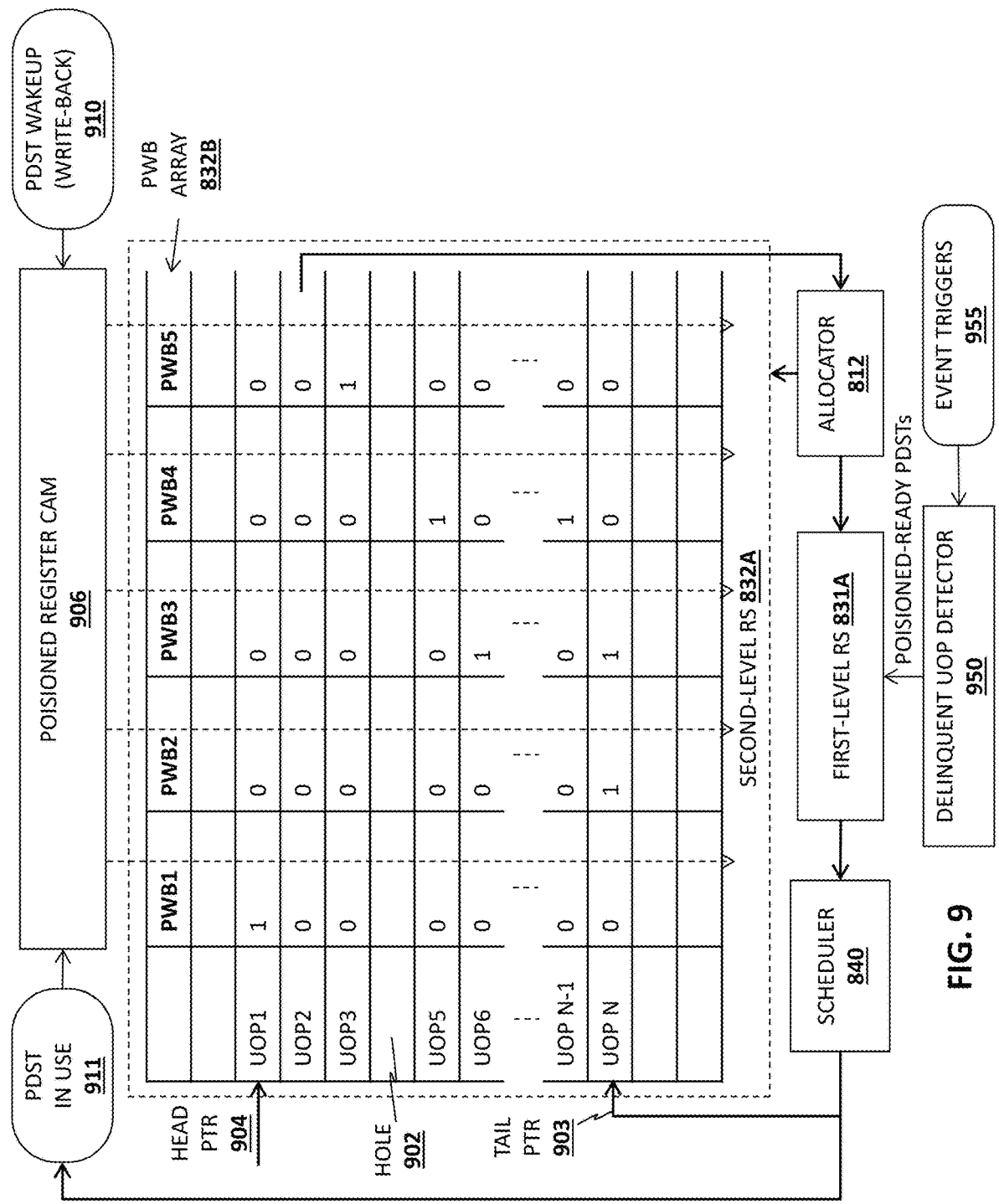
FIG. 9 illustrates additional details for one embodiment of a second-level reservation station.

As illustrated in FIG. 9, one embodiment of the second-level RS 832A is built as an ordered array with a head pointer 904 and a tail pointer 903. Holes 902 are created by entries which have been sent back to the first-level RS 831A before reaching the head pointer 904 (i.e., becoming the oldest uop in the second-level RS 832A). In the illustrated example the head pointer 904 points to the current oldest uop (UOP1) and the tail pointer 903 points to the youngest uop (UOP N). Alternatively, the tail pointer 903 may point to the next entry to be updated (one entry below the youngest uop). This sequential arrangement is used to perform significantly more efficient older vs younger determinations based on order when compared to the matrix scheduler in the first-level RS 831A.

In one embodiment, the second-level RS 832A uses an array of poison wakeup bits (PWBs) 832B to track those sources which are needed before the associated uops are awakened. The sources include one or more the physical destination registers ("PDST"). In one embodiment, the poison wakeup bits 832B have corresponding entries in a poisoned register content addressable memory (CAM) 906 which stores a set of entries that wait for and detect wakeups 910 in response to results of prior instructions. In one embodiment, when a long-latency instruction (or uops decoded from the instruction) writes back its physical destination register (PDST) 910 (e.g., via writeback path 890), it matches a particular CAM entry associated with this PDST, which triggers any entries waiting on that physical register as a source to clear their corresponding poison bits (indicating that the register is available). For example, if a CAM match is detected for the PDST associated with PWB3 in FIG. 9, then the corresponding bits are cleared for UOP6 and UOPN. When all poison bits 832B for an entry in the second level RS 832A are cleared (e.g., such as shown for the UOP2 entry with all zeroes), the entry is awakened and made eligible to move from the second-level RS 832A back to the first-level RS 831A.

In one implementation, chains of uops are awakened in potentially large batches (as opposed to fine-grained/individual wakeups). A "wakeup" from the second-level RS 832A does not necessarily mean that a uop is presently ready to schedule. Rather, it means that one or more of the uops are likely to schedule soon and therefore should be moved from the second-level RS 832A to the first-level RS 831A.

As mentioned, the second-level RS 832A uses an age-sorted organization, similar to a FIFO, but entries may move from the back of the second-level RS 832A to the first-level RS 831A before they are the oldest in the second level RS 832A. When this occurs, a hole 902 results in the second level RS 832A which is not filled, leaving the rest of the structure age-ordered. Entries in the second level RS 832A may be reclaimed when the oldest entry leaves the structure, and then the head pointer 904 is advanced forward, past any holes that may exist, to the next oldest entry that remains in the structure. When entries in the middle are moved/removed, the head pointer 904 is not advanced, and the machine does not attempt to reclaim them or reuse them, thereby preserving the ordered nature of the array and allowing for a more efficient ordering algorithm at the cost of some additional entries.

In one embodiment, a delinquent uop detector 950 detects certain specified event triggers 955 which cause uops to be marked as delinquent. Examples of event triggers include long latency cache misses and dependent (long-latency) divide operations, but other long-latency events may also be used as triggers. When the delinquent uop detector 950 detects one of these event triggers 955, it presents the PDST to the first-level RS 831A as a poisoned-ready destination. In response, the chain of uops dependent on this PDST are scheduled out of the first-level RS 831A into the second-level RS 832A. An indication of the PDST 911 is stored in the poisoned register CAM 90, and the associated PWBs are set in the PWB array 832B. In addition, any operations dependent on the uops are scheduled out from the first-level RS 831A to the second-level RS 832A as poisoned-dependents and the associated PWBs are updated accordingly.

In one embodiment, when a poisoned uop schedules out of the first-level RS 831A, it moves into the second-level RS instead of the dispatch pipeline (e.g., scheduler 840, dispatcher 850, etc). The scheduling circuitry 840 may perform the movement as illustrated. Alternatively, the RS Alternatively, the first-level RS 831A may include circuitry to move the poisoned uop to the second level RS 832A. In one embodiment, moving a uop from the first-level RS 831A to the second-level RS 832A causes a poisoned wakeup based on the PDST of the uop(s) being moved, which wakes up consumers with a poisoned bit set. The net result is that a plurality of uops dependent on a long-latency operation are moved from expensive entries in the first-level RS 831A into relatively less-expensive entries in the second-level RS 832A.

As mentioned, a long latency instruction wakes up entries in the second-level RS 832A by performing CAM lookups within the poisoned register CAM 906. When a CAM match is found, the poisoned register CAM 906 activates a wire specific to that CAM down the relevant column of PWB array 832B of the second level RS 832A, clearing the appropriate poison bit for every entry that was poisoned by this register. Entries may have 2-or-more poison bits set (e.g., UOP N in FIG. 9 has PWB2 and PWB3 set), and only become ready to move back from the second-level RS 832A to the first-level RS 831A when all poison bits are cleared.

In one embodiment, when entries move from the second-level RS 832A back into the first-level RS 831A, a ROB-based magnitude compare identifies whether the moving entries are older or younger than the existing entries and is used to recreate the age information inside the age-matrix. This is similar to the manner in which the age-matrix is managed in the load buffer.

Figure 10A:
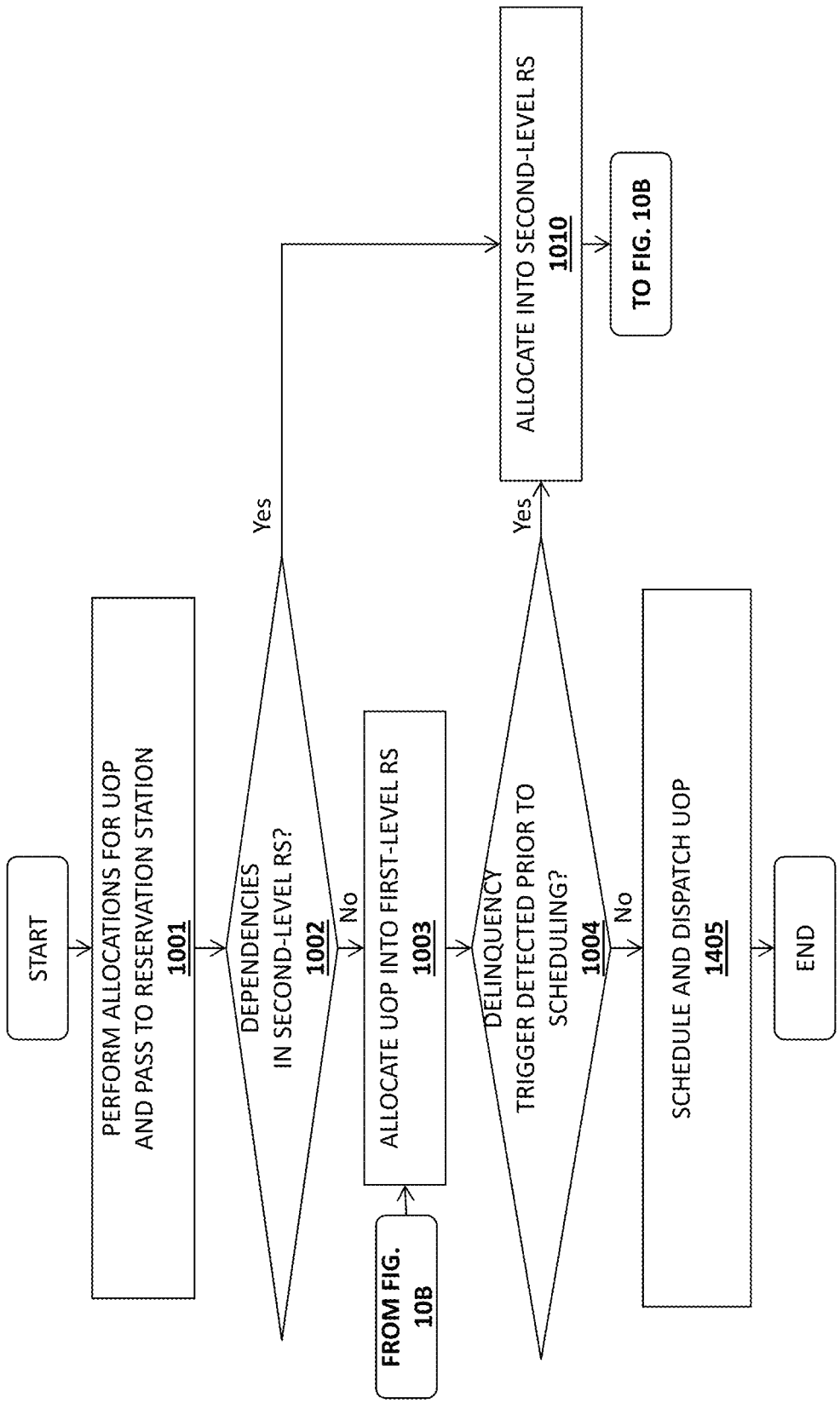

A method in accordance with one embodiment is illustrated in FIGS. 10A-B. The method may be implemented within the context of the architectures described above, but is not limited to any particular processor or system architecture.

At 1001 allocations are performed for a uop which is then passed to the reservation station (RS). For example, the allocator may perform register allocations prior to scheduling. At 1002, if dependencies are detected in the second-level RS, then the uop is automatically allocated to the second level RS at 1010.

If not, then at 1003, the uop is allocated into the first-level RS. During the time the uop is in the first-level RS, if a delinquency event is detected, determined at 1004, then the uop is allocated into the second-level RS at 1010. If not, then at 1405 the uop is scheduled and dispatched for execution.

Turning to FIG. 10B, after the uop is allocated into the second level RS at 1010, at 1011 an entry is created in the second-level RS, the relevant PWB bits are set, and/or an indication of the PDST creating the delinquency is stored (e.g., in the CAM). In addition, one or more additional entries are created for uops which are dependent on the current uop (and any relevant PWB(s) are set).

When a PDST wakeup event is detected at 1013 (e.g., because the PDST has been released) the relevant PWB entries are updated at 1014 to indicate that the associated register is no longer allocated to an operation. At 1015, at least one uop entry is identified which has all PWB bits cleared to reallocate back to the first-level RS. As mentioned, all PWB bits being cleared is an indication that the uop is currently ready or will soon be ready for scheduling. The process then returns to 1003 in FIG. 10A where the uop is allocated in the first-level RS.

Traditionally, uops coming from the front-end of the machine are the only entity that uses the allocation stage 812. The two-level RS 830 described herein adds another path into the allocation stage 812, where uops recirculate from the second-level RS 832A back into the first-level RS 831A sharing the same resources (ports) as allocation. In one embodiment, while a recirculating uop does not allocate every resource in the machine again, it does allocate entries in the first-level RS 831A.

A second required change is that front-end uops need to check for dependencies across both the first-level RS 831A and the second-level RS 8318. In one embodiment, if dependencies are discovered in the second-level RS 831B, they will allocate directly into the second-level RS 831B instead of allocating into the first-level RS 831A.

Figure 11:
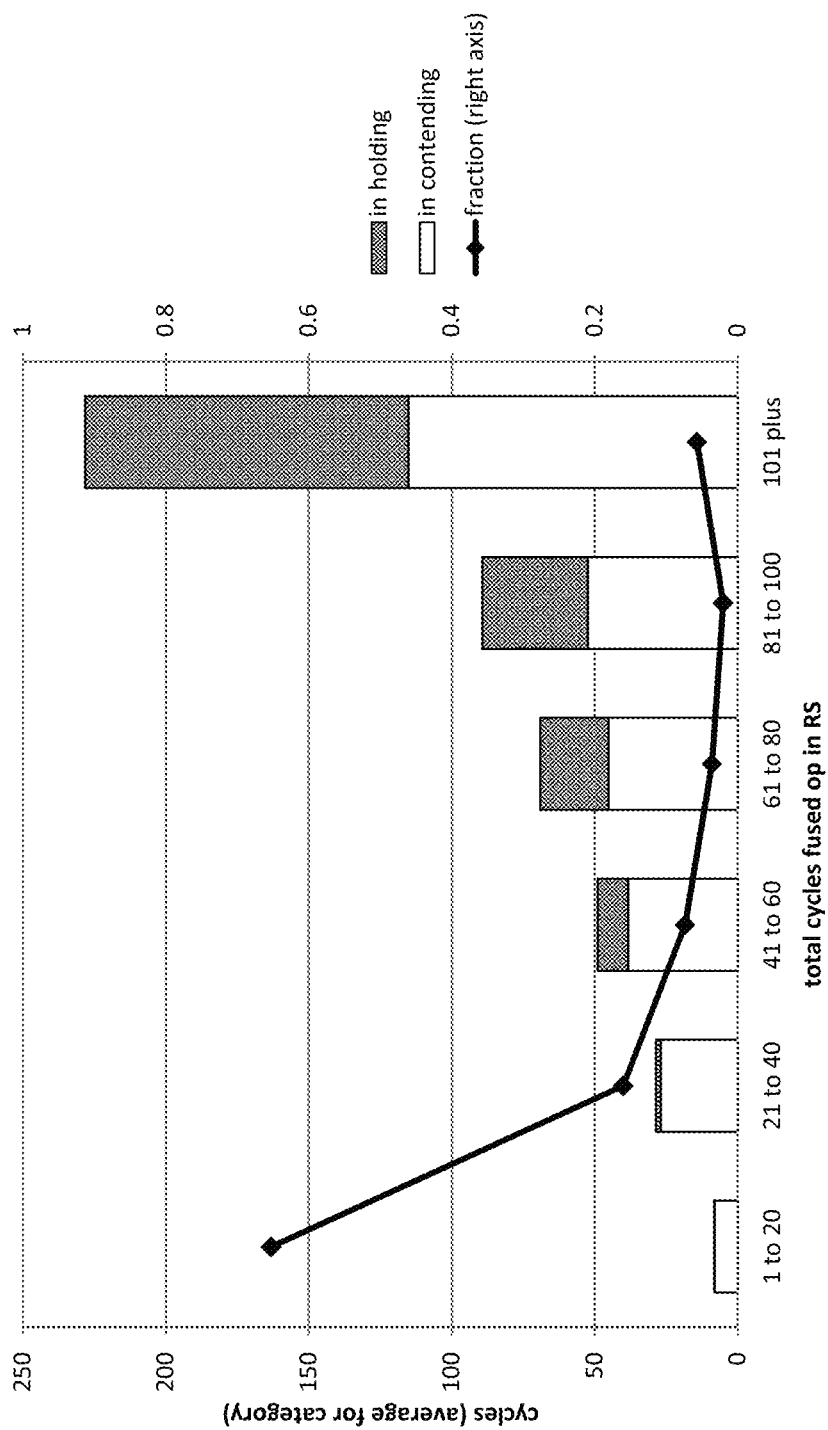
FIG. 11 illustrates test results in accordance with one embodiment.

The two-level RS scheme was modelled in the detailed coho simulator running a Skylake-sized machine during pathfinding for what eventually became the Sunnycove processor core. The results illustrated in FIG. 11 are generally conservative, as the RS has become a larger bottleneck in the generations after Skylake.

RS size is becoming a more critical bottleneck each new product generation, as other out-of-order buffers are expanded proportionally deeper than the RS. Experimental results have shown that a two-level RS scheme performs within 0.5% performance of a very large single-level RS without wakeup penalties, while there is no way to physically build a very large single-level RS without penalties.

For the two-level RS implementations, the graph below tracks the number of cycles that uops spent in the level 1 (contending) RS 831A and level 2 (holding) RS 831B. Note that the most RS occupancy is held by ops that are in the RS for more than 100 cycles (tracked by entries*cycles), compared to entries that are in the RS for only a few cycles.

Because the second-level RS 831B is more efficiently built than the existing RS, the entry-count of the overall RS can be significantly increased at a relatively low overall core area increase. On an older generation processor, this was estimated as a 1% area cost for a 50% growth in RS entries.

The first level RS 831A is allowed to remain small to effectively track and schedule the uops most likely to be ready soon. The size remains tractable, to minimize the complexity and cost in terms of area, cdyn, and timing to the critical back-to-back scheduling problem. The second-level RS 831B is built using more cost-effective techniques since it cannot achieve back-to-back scheduling—wakeups may be delayed, timing is more relaxed, and logic is simpler. However, the second-level RS 831B is more performant than a FIFO solution since uops do not move into and out of the second-level RS 831B in pure FIFO ordering; they can follow dependency order as described above, which allows the two-level RS 831B to behave performance-wise more like a very large single-level RS than a FIFO backing structure and a single-level RS.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

EXAMPLES

The following are example implementations of different embodiments of the invention.

Example 1

An apparatus comprising: execution circuitry comprising a plurality of functional units to execute a plurality of operations; a reservation station comprising a plurality of entries to store a corresponding plurality of operations to be executed on one or more of the functional units, the reservation station comprising: a first RS level to hold a first subset of the plurality of operations which are ready for execution by one or more functional units or which are expected to be ready for execution by the functional units; a second RS level to hold a second subset of the plurality of operations which are not expected to be ready for execution by the functional units; operation evaluation circuitry to evaluate operations in the first RS level and, responsive to identifying one or more operations which are not expected to be ready for execution, to cause the one or more operations to be moved from the first RS level to the second RS level.

Example 2

The apparatus of example 1 wherein an operation is expected to be ready for execution if one or more sources of the operation are expected to be ready within a specified number of processor cycles or within other specified duration.

Example 3

The apparatus of example 1 wherein the second RS level comprises an entry for each operation, arranged based on an order in which the operations were stored into the second RS level.

Example 4

The apparatus of example 3 wherein each entry comprises one or more bits, each bit associated with a source required to perform the corresponding operation, wherein a bit is set to a first value to indicate that a corresponding source is available and the bit is set to a second value to indicate that the corresponding source is not available.

Example 5

The apparatus of example 4 wherein an operation is to be moved to the first RS level when the one or more bits are all set to the first value.

Example 6

The apparatus of example 4 wherein the sources comprise registers and/or operands required by an operation.

Example 7

The apparatus of example 4 further comprising: bit update circuitry to change a first plurality of bits from the second value to the first value upon detecting that a first source has become available, each bit of the first plurality to be changed in a different entry associated with a different operation dependent on the first source.

Example 8

The apparatus of example 1 wherein the operations comprise microoperations, the apparatus further comprising: a decoder to decode instructions fetched from memory, the decoder to generate one or more microoperations responsive to decoding each instruction.

Example 9

The apparatus of example 8 further comprising: a scheduler to read operations from the first RS level and schedule execution of the operations by one or more of the functional units.

Example 10

The apparatus of claim 9 further comprising: a dispatcher to dispatch each operation for execution by one of the functional units.

Example 11

The apparatus of example 1 wherein the first RS level comprises different storage and processing characteristics than the second RS level.

Example 12

The apparatus of example 11 wherein the first RS level operates at a relatively higher performance level and consumes more power per operation than the second RS level.

Example 13

The apparatus of example 12 wherein the operation evaluation circuitry is to set a poison bit in each entry in the first RS level associated with each operation not expected to be ready for execution, each poison bit to cause each associated operation to be moved from the first RS level to the second RS level.

Example 14

A method comprising: receiving a plurality of operations at a reservation station (RS) having a first RS level and a second RS level; storing in the first RS level a first subset of the plurality of operations which are ready for execution by one or more functional units or which are expected to be ready for execution by the functional units; storing in the second RS level a second subset of the plurality of operations which are not expected to be ready for execution by the functional units; and evaluating operations in the first RS level and, responsive to identifying one or more operations which are not expected to be ready for execution, to cause the one or more operations to be moved from the first RS level to the second RS level.

Example 15

The method of example 14 wherein an operation is expected to be ready for execution if one or more sources of the operation are expected to be ready within a specified number of cycles or other specified duration.

Example 16

The method of example 14 wherein the second RS level comprises an entry for each operation, arranged based on an order in which the operations were stored into the second RS level.

Example 17

The method of example 3 wherein each entry comprises one or more bits, each bit associated with a source required for the associated operation, wherein a bit is set to a first value to indicate that a corresponding source is available and the bit is set to a second value to indicate that the corresponding source is not available.

Example 18

The method of example 17 further comprising: moving an operation back to the first RS level from the second RS level when the one or more bits are all set to the first value.

Example 19

The method of example 17 wherein the sources comprise registers required by an operation.

Example 20

The method of example 17 further comprising: changing a first plurality of bits from the second value to the first value upon detecting that a first source has become available, each bit of the first plurality to be changed in a different entry associated with a different operation dependent on the first source.

Example 21

The method of example 14 wherein the operations comprise microoperations, the method further comprising: decoding instructions fetched from memory and responsively generating one or more microoperations responsive to decoding each instruction.

Example 22

The method of example 21 further comprising: reading operations from the first RS level; and scheduling execution of the operations by one or more of the functional units.

Example 23

The method of example 22 further comprising: dispatching each operation for execution by one of the functional units.

Example 24

A machine-readable medium having program code stored thereon which, when executed by a machine, causes the machine to perform the operations of: receiving a plurality of operations at a reservation station (RS) having a first RS level and a second RS level; storing in the first RS level a first subset of the plurality of operations which are ready for execution by one or more functional units or which are expected to be ready for execution by the functional units; storing in the second RS level a second subset of the plurality of operations which are not expected to be ready for execution by the functional units; and evaluating operations in the first RS level and, responsive to identifying one or more operations which are not expected to be ready for execution, to cause the one or more operations to be moved from the first RS level to the second RS level.

Example 25

The machine-readable medium of example 24 wherein an operation is expected to be ready for execution if one or more sources of the operation are expected to be ready within a specified number of cycles or other specified duration.

Example 26

The machine-readable medium of example 24 wherein the second RS level comprises an entry for each operation, arranged based on an order in which the operations were stored into the second RS level.

Example 27

The machine-readable medium of example 26 wherein each entry comprises one or more bits, each bit associated with a source required for the associated operation, wherein a bit is set to a first value to indicate that a corresponding source is available and the bit is set to a second value to indicate that the corresponding source is not available.

Example 28

The machine-readable medium of example 24 further comprising program code to cause the machine to perform the operations of: moving an operation back to the first RS level from the second RS level when the one or more bits are all set to the first value.

Example 29

The machine-readable medium of example 27 wherein the sources comprise registers required by an operation.

Example 30

The machine-readable medium of example 27 further comprising program code to cause the machine to perform the operations of: changing a first plurality of bits from the second value to the first value upon detecting that a first source has become available, each bit of the first plurality to be changed in a different entry associated with a different operation dependent on the first source.

Example 31

The machine-readable medium of example 24 wherein the operations comprise microoperations, the machine-readable medium further comprising program code to cause the machine to perform the operations of: decoding instructions fetched from memory and responsively generating one or more microoperations responsive to decoding each instruction.

Example 32

The machine-readable medium of example 31 further comprising program code to cause the machine to perform the operations of: reading operations from the first RS level; and scheduling execution of the operations by one or more of the functional units.

Example 33

The machine-readable medium of example 32 further comprising program code to cause the machine to perform the operations of: dispatching each operation for execution by one of the functional units.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
   execution circuitry comprising a plurality of functional units to execute a plurality of operations;
   a reservation station comprising a plurality of entries to store a corresponding plurality of operations to be executed on one or more of the functional units, the reservation station comprising:
      a first RS level to hold a first subset of the plurality of operations which are ready for execution by one or more functional units or which are expected to be ready for execution by the functional units;
      a second RS level to hold a second subset of the plurality of operations which are not expected to be ready for execution by the functional units; and
      operation evaluation circuitry to evaluate operations in the first RS level and, responsive to identifying one or more operations which are not expected to be ready for execution, to cause the one or more operations to be moved from the first RS level to the second RS level.

2. The apparatus of claim 1 wherein an operation is expected to be ready for execution if one or more sources of the operation are expected to be ready within a specified number of processor cycles or within other specified duration.

3. The apparatus of claim 1 wherein the second RS level comprises an entry for each operation, arranged based on an order in which the operations were stored into the second RS level.

4. The apparatus of claim 3 wherein each entry comprises one or more bits, each bit associated with a source required to perform the corresponding operation, wherein a bit is set to a first value to indicate that a corresponding source is available and the bit is set to a second value to indicate that the corresponding source is not available.

5. The apparatus of claim 4 wherein an operation is to be moved to the first RS level when the one or more bits are all set to the first value.

6. The apparatus of claim 4 wherein the sources comprise registers and/or operands required by an operation.

7. The apparatus of claim 4 further comprising:
   bit update circuitry to change a first plurality of bits from the second value to the first value upon detecting that a first source has become available, each bit of the first plurality to be changed in a different entry associated with a different operation dependent on the first source.

8. The apparatus of claim 1 wherein the operations comprise microoperations, the apparatus further comprising:
   a decoder to decode instructions fetched from memory, the decoder to generate one or more microoperations responsive to decoding each instruction.

9. The apparatus of claim 8 further comprising:
   a scheduler to read operations from the first RS level and schedule execution of the operations by one or more of the functional units.

10. The apparatus of claim 9 further comprising:
    a dispatcher to dispatch each operation for execution by one of the functional units.

11. The apparatus of claim 1 wherein the first RS level comprises different storage and processing characteristics than the second RS level.

12. The apparatus of claim 11 wherein the first RS level operates at a relatively higher performance level and consumes more power per operation than the second RS level.

13. The apparatus of claim 12 wherein the operation evaluation circuitry is to set a poison bit in each entry in the first RS level associated with each operation not expected to be ready for execution, each poison bit to cause each associated operation to be moved from the first RS level to the second RS level.

14. A method comprising:
    receiving a plurality of operations at a reservation station (RS) having a first RS level and a second RS level;
    storing in the first RS level a first subset of the plurality of operations which are ready for execution by one or more functional units or which are expected to be ready for execution by the functional units;
    storing in the second RS level a second subset of the plurality of operations which are not expected to be ready for execution by the functional units; and
    evaluating operations in the first RS level and, responsive to identifying one or more operations which are not expected to be ready for execution, to cause the one or more operations to be moved from the first RS level to the second RS level.

15. The method of claim 14 wherein an operation is expected to be ready for execution if one or more sources of the operation are expected to be ready within a specified number of cycles or other specified duration.

16. The method of claim 14 wherein the second RS level comprises an entry for each operation, arranged based on an order in which the operations were stored into the second RS level.

17. The method of claim 16 wherein each entry comprises one or more bits, each bit associated with a source required for the associated operation, wherein a bit is set to a first value to indicate that a corresponding source is available and the bit is set to a second value to indicate that the corresponding source is not available.

18. The method of claim 17 further comprising:
    moving an operation back to the first RS level from the second RS level when the one or more bits are all set to the first value.

19. The method of claim 17 wherein the sources comprise registers required by an operation.

20. The method of claim 17 further comprising:
    changing a first plurality of bits from the second value to the first value upon detecting that a first source has become available, each bit of the first plurality to be changed in a different entry associated with a different operation dependent on the first source.

21. The method of claim 14 wherein the operations comprise microoperations, the method further comprising:
    decoding instructions fetched from memory and responsively generating one or more microoperations responsive to decoding each instruction.

22. The method of claim 21 further comprising:
    reading operations from the first RS level; and
    scheduling execution of the operations by one or more of the functional units.

23. The method of claim 22 further comprising:
    dispatching each operation for execution by one of the functional units.

24. A non-transitory machine-readable medium having program code stored thereon which, when executed by a machine, causes the machine to perform the operations of:
  receiving a plurality of operations at a reservation station (RS) having a first RS level and a second RS level;
  storing in the first RS level a first subset of the plurality of operations which are ready for execution by one or more functional units or which are expected to be ready for execution by the functional units;
  storing in the second RS level a second subset of the plurality of operations which are not expected to be ready for execution by the functional units; and
  evaluating operations in the first RS level and, responsive to identifying one or more operations which are not expected to be ready for execution, to cause the one or more operations to be moved from the first RS level to the second RS level.

25. The non-transitory machine-readable medium of claim 24 wherein an operation is expected to be ready for execution if one or more sources of the operation are expected to be ready within a specified number of cycles or other specified duration.

26. The non-transitory machine-readable medium of claim 24 wherein the second RS level comprises an entry for each operation, arranged based on an order in which the operations were stored into the second RS level.

27. The non-transitory machine-readable medium of claim 26 wherein each entry comprises one or more bits, each bit associated with a source required for the associated operation, wherein a bit is set to a first value to indicate that a corresponding source is available and the bit is set to a second value to indicate that the corresponding source is not available.

28. The non-transitory machine-readable medium of claim 24 further comprising program code to cause the machine to perform the operations of:
  moving an operation back to the first RS level from the second RS level when the one or more bits are all set to the first value.

29. The non-transitory machine-readable medium of claim 27 wherein the sources comprise registers required by an operation.

30. The non-transitory machine-readable medium of claim 27 further comprising program code to cause the machine to perform the operations of:
  changing a first plurality of bits from the second value to the first value upon detecting that a first source has become available, each bit of the first plurality to be changed in a different entry associated with a different operation dependent on the first source.

31. The non-transitory machine-readable medium of claim 24 wherein the operations comprise microoperations, the machine-readable medium further comprising program code to cause the machine to perform the operations of:
  decoding instructions fetched from memory and responsively generating one or more microoperations responsive to decoding each instruction.

32. The non-transitory machine-readable medium of claim 31 further comprising program code to cause the machine to perform the operations of:
  reading operations from the first RS level; and
  scheduling execution of the operations by one or more of the functional units.

33. The non-transitory machine-readable medium of claim 32 further comprising program code to cause the machine to perform the operations of:
  dispatching each operation for execution by one of the functional.

* * * * *